United States Patent
Inoue et al.

(10) Patent No.: US 10,421,231 B2
(45) Date of Patent: Sep. 24, 2019

(54) HEAT-SHRINKABLE POLYESTER FILM AND PACKAGE

(71) Applicant: TOYOBO CO., LTD., Osaka-shi, Osaka (JP)

(72) Inventors: Masafumi Inoue, Tsuruga (JP); Masayuki Haruta, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 30 days.

(21) Appl. No.: 15/749,235

(22) PCT Filed: Aug. 1, 2016

(86) PCT No.: PCT/JP2016/072480
§ 371 (c)(1),
(2) Date: Jan. 31, 2018

(87) PCT Pub. No.: WO2017/022703
PCT Pub. Date: Feb. 9, 2017

(65) Prior Publication Data
US 2018/0229422 A1 Aug. 16, 2018

(30) Foreign Application Priority Data
Aug. 5, 2015 (JP) .................. 2015-154978

(51) Int. Cl.
*B29C 61/06* (2006.01)
*B65D 65/02* (2006.01)
(Continued)

(52) U.S. Cl.
CPC .......... *B29C 61/0666* (2013.01); *B29C 61/06* (2013.01); *B65D 65/02* (2013.01);
(Continued)

(58) Field of Classification Search
CPC ..... B29C 61/0666; B29C 61/06; B65D 65/02; B65D 75/02; B65D 65/14; C08J 5/18; C08J 2367/02; C08L 67/02
See application file for complete search history.

(56) References Cited

U.S. PATENT DOCUMENTS

2005/0010018 A1  1/2005  Kim et al.
2009/0227735 A1  9/2009  Shih et al.
(Continued)

FOREIGN PATENT DOCUMENTS

EP  1491576 A1  12/2004
JP  H03-142224 A  6/1991
(Continued)

OTHER PUBLICATIONS

Japanese Patent Office, International Search Report in International Patent Application No. PCT/JP2016/072480 (dated Oct. 25, 2016).
(Continued)

*Primary Examiner* — Michael C Miggins
(74) *Attorney, Agent, or Firm* — Leydig, Voit & Mayer, Ltd.

(57) ABSTRACT

The invention provides a heat-shrinkable polyester film which has sufficient heat shrinkage properties in the main shrinkage direction that is the longitudinal direction without containing a monomer component that can form an amorphous component in a large amount, and which has a low heat shrinkage and a low shrinkage stress in the width direction orthogonal to the main shrinkage direction. The film has a heat shrinkage of 15-50% in a main shrinkage direction of the film and 0-12% in a direction orthogonal to the main shrinkage direction of the film, when treated for 10 seconds in hot water of 90° C., and a maximum shrinkage stress of 2-10 MPa in the main shrinkage direction of the film when measured under hot air of 90° C. The film contains 7-30 mol % of a constituent unit derived from
(Continued)

diethylene glycol in 100 mol % of the whole polyester resin component.

18 Claims, 1 Drawing Sheet

(51) Int. Cl.
*B65D 75/02* (2006.01)
*C08J 5/18* (2006.01)
*B65D 65/14* (2006.01)
*C08L 67/02* (2006.01)

(52) U.S. Cl.
CPC ............ *B65D 65/14* (2013.01); *B65D 75/02* (2013.01); *C08J 5/18* (2013.01); *C08J 2367/02* (2013.01); *C08L 67/02* (2013.01)

(56) References Cited

U.S. PATENT DOCUMENTS

| | | |
|---|---|---|
| 2011/0224369 A1 | 9/2011 | Kim et al. |
| 2015/0175756 A1 | 6/2015 | Haruta et al. |
| 2015/0218308 A1 | 8/2015 | Haruta et al. |

FOREIGN PATENT DOCUMENTS

| | | |
|---|---|---|
| JP | 2011-513550 A | 4/2011 |
| JP | 2011-184690 A | 9/2011 |
| JP | 2014-055236 A | 3/2014 |
| WO | WO 2014/021120 A1 | 2/2014 |
| WO | WO 2014/034704 A1 | 3/2014 |

OTHER PUBLICATIONS

European Patent Office, Extended European Search Report in European Patent Application No. 16832982.9 (dated Mar. 14, 2019).

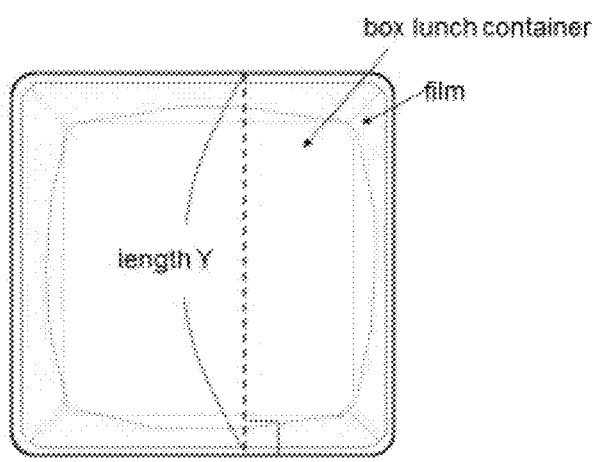

HEAT-SHRINKABLE POLYESTER FILM AND PACKAGE

CROSS-REFERENCE TO RELATED APPLICATIONS

This patent application is the U.S. national phase of International Patent Application No. PCT/JP2016/072480, filed Aug. 1, 2016, which claims the benefit of Japanese Patent Application No. 2015-154978, filed on Aug. 5, 2015, which are incorporated by reference in their entireties herein.

TECHNICAL FIELD

The present invention relates to a heat-shrinkable polyester film and a package. More particularly, the present invention relates to a heat-shrinkable polyester film which is suitable for a label application and a banding application to bind a box lunch container or the like and does not contain an amorphous component as a monomer component constituting a polyester in a large amount, the heat-shrinkable polyester film having a high shrinkage in the main shrinkage direction and a low shrinkage in the direction orthogonal to the main shrinkage direction and being less likely to generate separation of the bonded portion of a label and deformation of a container due to low shrinkage stress.

BACKGROUND ART

Recently, in applications such as label package doubling as a protection of a glass bottle and a PET bottle etc. and display of articles, cap sealing, and accumulation package, there have been widely used drawn films (so-called heat-shrinkable films) composed of a polyvinyl chloride resin, a polystyrene resin, a polyester resin or the like. Of these heat-shrinkable films, a polyvinyl chloride film has problems that heat resistance is low, and it generates hydrogen chloride gas in incineration and causes dioxin. A polystyrene film has problems that it is inferior in solvent resistance, as well as an ink with a special composition needs to be used in printing, it requires high temperature incineration and generates a lot of black smoke accompanied by an abnormal odor in incineration. Therefore, as a shrink label, there has been widely used a polyester-based heat-shrinkable film which is high in heat resistance, easy to incinerate, and excellent in solvent resistance, and the use amount tends to increase being accompanied by an increase in distribution volume of PET containers.

As an ordinary heat-shrinkable polyester film, one which is allowed to shrink greatly in the width direction has been widely utilized. Although such a heat-shrinkable polyester film in which the width direction is the main shrinkage direction is subjected to drawing at a high ratio in the width direction in order to exhibit shrinkage properties in the width direction, with regard to the longitudinal direction orthogonal to the main shrinkage direction, there have been many cases in which the film is only subjected to drawing at a low ratio and there is also a case in which the film is not subjected to drawing. The film subjected to drawing only at a low ratio in the longitudinal direction and the film subjected to drawing only in the width direction have a drawback that the mechanical strength in the longitudinal direction is poor.

When the film is used as a label film for a bottle or a banding film for binding a box lunch container or the like, the film should be made into an annular form, mounted to the bottle or the box lunch container, and then allowed to heat-shrink in the circumferential direction. Therefore, when a heat-shrinkable film that heat-shrinks in the width direction is mounted as a banding film, after forming an annular-shaped member such that the width direction of the film is in the circumferential direction, the annular-shaped member should be cut into segments having a predetermined length, and each segment should be mounted to the bottle or the box lunch container, for example, by placing it by hand over the bottle or the box lunch container. Therefore, it is difficult to mount a label film or a banding film made of the heat-shrinkable film that heat-shrinks in the width direction to a bottle or a box lunch container at high speed. For that reason, recently, there is a need for a longitudinally heat-shrinkable film which can be wound around a bottle or a box lunch container directly from a film roll to mount the bottle or the box lunch container. With such a heat-shrinkable film, a center sealing step in which an annular-shaped member is formed and sealed or processing such as cutting, placing by hand, or the like can be eliminated, and thus mounting at high speed is also possible.

Furthermore, a film made of recycled raw materials derived from PET bottles is highly demanded in terms of environmental awareness. Since raw materials containing amorphous components in a large amount are used in an ordinary heat-shrinkable polyester film in order to impart heat shrinkage properties, the mixing rate of recycled raw materials is limited, and therefore it has not been possible to provide a heat-shrinkable polyester film containing recycled raw materials in a large amount. However, as described in Patent Document 1, it is known that a heat-shrinkable polyester film having sufficient shrinkage properties and high mechanical strength in the longitudinal direction as well as having small thickness irregularity in the longitudinal direction can be produced by contriving the drawing conditions even without using amorphous components in a large amount.

However, in the heat-shrinkable polyester film obtained by using raw materials which do not contain amorphous components in a large amount, the drawing stress at the time of drawing becomes high, and hence the stress at the time of shrinking, namely, the shrinkage stress becomes high. As a problem caused by a high shrinkage stress, for example, in the case of a label of a bottle in which after winding a film around the bottle, the end parts of the label are bonded to each other with an adhesive or the like and then the label is heated to finish shrinking, if the shrinkage stress is high, troubles such as displacement or separation of the bonded portion may occur. Moreover, in recent years, for the purpose of weight saving and waste reduction, containers with a small thickness are sometimes used as containers for box lunches and prepared foods, which are sold at convenience stores and supermarkets. The container with a small thickness decreases also in strength, and therefore if the shrinkage stress of a shrinkable film for packaging is high, a trouble of deformation of the container due to the shrinkage stress occurs.

PRIOR ART DOCUMENT

Patent Documents

Patent Document 1: International Publication WO 2014/021120

SUMMARY OF THE INVENTION

Problems to be Solved by the Invention

The present invention aims to solve the above-described problems of Patent Document 1 and to provide a heat-shrinkable polyester film which has sufficient heat shrinkage properties in the main shrinkage direction that is the longitudinal direction even without containing a monomer component that can form an amorphous component in a large amount, and which has a low heat shrinkage and a low shrinkage stress in the width direction orthogonal to the main shrinkage direction.

Means for Solving the Problem

That is, the present invention has the following constitution.

1. A heat-shrinkable polyester film comprising ethylene terephthalate as a main constituent component and containing 0 mol % or more and 5 mol % or less of a monomer component that can form an amorphous component in a whole polyester resin component, wherein the heat-shrinkable polyester film satisfies the following requirements (1) to (4):

(1) the film has a hot-water heat shrinkage of 15% or more and 50% or less in a main shrinkage direction of the film when treated for 10 seconds in hot water of 90° C.;

(2) the film has a hot-water heat shrinkage of 0% or more and 12% or less in a direction orthogonal to the main shrinkage direction of the film when treated for 10 seconds in hot water of 90° C.:

(3) the film has a maximum shrinkage stress of 2 MPa or more and 10 MPa or less in the main shrinkage direction of the film when measured under hot air of 90° C.; and (4) the film contains 7 mol % or more and 30 mol % or less of a constituent unit derived from diethylene glycol in 100 mol % of the whole polyester resin component.

2. The heat-shrinkable polyester film according to claim 1, wherein the film has a tensile breaking strength of 80 MPa or more and 200 MPa or less in the direction orthogonal to the main shrinkage direction of the film.

3. The heat-shrinkable polyester film according to claim 1 or 2, wherein the film has a thickness irregularity of 13% or less in the main shrinkage direction of the film.

4. The heat-shrinkable polyester film according to any of claims 1 to 3, wherein in a measurement of a shrinkage stress in the main shrinkage direction of the film under hot air of 90° C., a shrinkage stress after 30 seconds from the initiation of the measurement is 60% or more and 100% or less relative to the maximum shrinkage stress.

5. The heat-shrinkable polyester film according to any of claims 1 to 4, wherein the main shrinkage direction is the longitudinal direction of the film.

6. A package having a label derived from the heat-shrinkable polyester film according to any of claims 1 to 5 at least a part of an outer periphery of an object to be packaged.

Effects of the Invention

The present invention makes it possible to solve the above-described problems of Patent Document 1 and to provide a heat-shrinkable polyester film which has sufficient heat shrinkage properties in the main shrinkage direction that is the longitudinal direction even without containing a monomer component that can form an amorphous component in a large amount, and which has a low heat shrinkage and a low shrinkage stress in the width direction orthogonal to the main shrinkage direction. In addition, the present invention makes it possible to provide a heat-shrinkable polyester film highly ecological and containing recycled polyester of PET bottles or polyester prepared using bio-derived raw materials in a large amount since there is no need to add a large amount of monomer components that can form an amorphous component to raw materials. The heat-shrinkable polyester film of the present invention can be suitably used as a film label for a bottle, a banding film for a box lunch container, or the like, and can be attached on the bottle or container highly efficiently within a short time. In addition, when the film is heat-shrunk after the attachment, good finishing with extremely reduced separation of the bonded portion and extremely reduced container deformation can be provided.

BRIEF DESCRIPTION OF THE DRAWINGS

The FIGURE shows a box lunch plastic container in a package after shrinkage finishing, which was evaluated for container deformation.

MODE FOR CARRYING OUT THE INVENTION

Hereinafter, the heat-shrinkable polyester film according to the present invention will be described in detail. A method for producing the heat-shrinkable polyester film will be described in detail later, but the film is usually obtained by transporting and drawing with a roll or the like. Here, the transporting direction of the film is referred to as a longitudinal direction, and a direction orthogonal to the longitudinal direction is referred to as a width direction of the film. Therefore, the width direction of the heat-shrinkable polyester film described below means a direction orthogonal to an unwinding direction of the roll, and the longitudinal direction of the film means a direction parallel to the unwinding direction of the roll. The main shrinkage direction of the heat-shrinkable polyester films obtained in Examples and Comparative Examples is the longitudinal direction.

A preferable production method for continuously producing any of the above-mentioned first to third heat-shrinkable polyester films is a method comprising drawing an undrawn polyester film, the film containing ethylene terephthalate as a main constituent component and containing 0 mol % or more and 5 mol % or less of a monomer component that can form an amorphous component in the whole polyester resin component, at a draw ratio of 3.5 times or more and 6 times or less in the width direction at a temperature of Tg+5° C. or higher and Tg+40° C. or lower in the state of holding both ends of the film in the width direction with clips in a tenter; thereafter drawing the film at a draw ratio of 1.5 times or more and 2.7 times or less in the longitudinal direction at a temperature of Tg+5° C. or higher and Tg+40° C. or lower with use of heated rolls at different speeds; and subsequently, relaxing the film by 0% or more and 15% or less in the width direction while subjecting the film to heat treatment at a temperature of Tg or higher and Tg+40° C. or lower in the state of holding both ends of the film with clips.

As described in Patent Document 1, a contrivance for film formation conditions for obtaining a shrinkable film which has a high shrinkage, high mechanical strength, and small thickness irregularity in the longitudinal direction without using amorphous raw materials in a large amount is to draw the film at a relatively high draw ratio in the width direction to cause orientation crystallization so that a shrinkage in the direction orthogonal to the main shrinkage direction is suppressed, and to draw the film at a relatively low draw ratio in a subsequent lengthwise drawing to create a state in which the molecules are oriented but orientation crystallization is small.

However, if the film is based on raw materials containing crystalline raw materials in a large amount, a drawing stress at the time of lengthwise drawing becomes high even at a low draw ratio. Moreover, since the film is drawn at a relatively high draw ratio in the width direction to cause orientation crystallization orientation, the stress in the subsequent lengthwise drawing becomes higher. The stress at the time of drawing is closely related to the shrinkage stress of the film, and it is necessary to reduce the drawing stress in order to lower the shrinkage stress. The present inventors have focused their attention on diethylene glycol as a glycol component that can reduce the drawing stress at the time of lengthwise drawing. When the content of diethylene glycol is increased, heat resistance deteriorates, and discharge of foreign matters increases during melt extrusion. For this reason, diethylene glycol hitherto has not been actively used. However, the present inventors have found that when diethylene glycol is used, the drawing stress at the time of drawing of the film decreases, and only the shrinkage stress decreases without significant reduction in shrinkage.

The film of the present invention contains ethylene terephthalate as a main constituent component. Herein, the main constituent component means that ethylene terephthalate is in an amount of 70 mol % or more in the whole constituent component of a polymer constituting the film. Use of ethylene terephthalate as a main constituent component can provide excellent mechanical strength and transparency.

A polymerization method to be employed for obtaining polyethylene terephthalate (hereinafter, may be referred to as simply PET) may be any production method such as a direct polymerization method for causing direct reaction of terephthalic acid and ethylene glycol and, if necessary, other dicarboxylic acid components and diol components; a trans-esterification method for causing transesterification of terephthalic acid dimethyl ester (including other dicarboxylic acid methyl esters if necessary) and ethylene glycol (including other diol components if necessary); etc.

The intrinsic viscosity of polyethylene terephthalate is preferably in a range of 0.45 to 0.8. If the intrinsic viscosity is less than 0.45, the film is crystallized by drawing and the shrinkage property is lowered, and therefore it is not preferable. If the intrinsic viscosity is more than 0.8, the filtration pressure increases and highly precise filtration is difficult to be carried out, and therefore it is not so preferable.

Among PET, recycled raw materials of PET bottles can be used in the present invention (hereinafter, may be simply referred to as recycled raw materials). Recycled raw materials basically contain PET as a constituent component for good moldability at the time of producing PET bottles, but generally contain isophthalic acid as a monomer component in a small amount. In the present invention, polymer raw materials containing a large amount of a monomer component that can form an amorphous component are not used in a large amount, but isophthalic acid may be contained in the recycled raw materials, so that it is expressed such that an amorphous monomer is contained in a range of 0 mol % or more and 5 mol % or less in 100 mol % of the whole polyester resin component.

A representative example of the monomer that can form an amorphous component is isophthalic acid, and examples of the monomer may also include neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, and hexanediol. These monomers may be contained within the above-mentioned range without any particular problem.

Here, the interpretation of the term "can form an amorphous component" is described in detail.

In the present invention, the "amorphous polymer" specifically refers to the case where no endothermic peak due to fusion is shown in measurement with a differential scanning calorimeter (DSC). Since the crystallization of the amorphous polymer does not substantially proceed, the amorphous polymer cannot be in a crystalline state or has an extremely low degree of crystallinity even when crystallized.

Furthermore, in the present invention, the "crystalline polymer" refers to a polymer other than the above-mentioned "amorphous polymer", that is, the case where an endothermic peak due to fusion is shown in measurement with a differential scanning calorimeter (DSC). The crystalline polymer means a polymer that can be crystallized when heated, has a crystallizable property, or has been already crystallized In general, as for a polymer being in a state where a plurality of monomer units are bonded, when the polymer has various conditions such as low stereoregularity of a polymer, poor symmetry of a polymer, a large side chain of a polymer, a large number of branches of a polymer, and low intermolecular cohesion between polymers, the polymer becomes amorphous. However, depending on the existence state, the crystallization sufficiently proceeds, and the polymer may become crystalline. For example, even for a polymer having a large side chain, when the polymer is composed of a single monomer unit, the crystallization of the polymer may sufficiently proceed, and the polymer may become crystalline. For this reason, even if the polymer is composed of the same monomer unit, the polymer can become crystalline or can become amorphous, and therefore in the present invention, the expression "unit derived from a monomer that can form an amorphous component" is used.

The monomer unit in the present invention means a repeating unit constituting a polymer induced from one polyhydric alcohol molecule and one polybasic carboxylic acid molecule.

When a monomer unit composed of terephthalic acid and ethylene glycol is a main monomer unit constituting a polymer, examples of the above unit derived from a monomer that can form an amorphous component include a monomer unit composed of isophthalic acid and ethylene glycol, a monomer unit composed of terephthalic acid and neopentyl glycol, a monomer unit composed of terephthalic acid and 1,4-cyclohexanedimethanol, and a monomer unit composed of isophthalic acid and butanediol, or the like.

Polyester raw materials using ethylene glycol produced from plant-derived raw materials as a glycol component (hereinafter, may be simply referred to as bio-polyester raw materials) can be used in the present invention.

When the heat-shrinkable polyester film of the present invention is treated for 10 seconds in no-load state in hot water of 90° C., a heat shrinkage (namely, hot-water heat shrinkage of 90° C.) in the main shrinkage direction of the film calculated from the lengths before and after shrinkage according to the following Equation 1 is preferably 15% or more and 50% or less.

Heat shrinkage={(length before shrinkage−length after shrinkage)/length before shrinkage}× 100(%)            Equation 1

If the hot-water heat shrinkage in the main shrinkage direction at 90° C. is less than 15%, in the case of using the film as a label or a banding film, wrinkles and slack are generated in the label or the banding film after heat shrinkage because of a small shrinkage amount, and therefore this is not preferable. On the other hand, there is no particular problem even if the hot-water heat shrinkage in the main shrinkage direction at 90° C. is more than 50%, but in the present invention, the heat shrinkage is normally about 50% as the upper limit. Additionally, the lower limit of the hot-water heat shrinkage in the main shrinkage direction at 90° C. is preferably 20%, more preferably 25%, and particularly preferably 30%.

Furthermore, when the heat-shrinkable polyester film of the present invention is treated for 10 seconds in no-load state in hot water of 90° C., a hot-water heat shrinkage in the direction orthogonal to the main shrinkage direction of the film calculated from the lengths before and after shrinkage according to the above Equation 1 is preferably 0% or more and 12% or less. If the hot-water heat shrinkage in the direction orthogonal to the main shrinkage direction at 90° C. exceeds 12%, in the case of using the film as a label or a banding film, the length of the film in the direction orthogonal to the shrinkage direction decreases at the time of heat-shrinking, and therefore this is not preferable. On the other hand, if the hot-water heat shrinkage in the direction orthogonal to the main shrinkage direction at 90° C. is less than 0%, the length of the label in the direction orthogonal to the main shrinkage direction increases at the time of heat-shrinking, the label becomes slack and tends to wrinkle, and therefore this is not preferable. Additionally, the hot-water heat shrinkage in the direction orthogonal to the main shrinkage direction at 90° C. is preferably 1% or more and 11% or less, more preferably 2% or more and 10% or less, and further more preferably 3% or more and 9% or less.

With regard to the heat-shrinkable polyester film of the present invention, the maximum heat shrinkage stress in the main shrinkage direction of the film measured under hot air of 90° C. is preferably 2 MPa or more and 10 MPa or less. In this connection, the measurement of the shrinkage stress is performed by a method described in Examples.

When the maximum shrinkage stress in the main shrinkage direction at 90° C. exceeds 10 MPa, lifting and separation of the bonded portion of a label may occur, or in the case of a thin-walled container, the shrinkage stress may cause the collapse of the container at the time of shrinking, and this is not preferable. The maximum shrinkage stress at 90° C. is more preferably 9 MPa or less, and further preferably 8 MPa or less. Conversely, when the maximum shrinkage stress at 90° C. is less than 2 MPa, at the time of being used as a label for a container, the label may become slack and may not be closely brought into contact with the container, and this is not preferable. The maximum shrinkage stress at 90° C. is more preferably 2.5 MPa or more, and further preferably 3 MPa or more.

The shrinkage stress after 30 seconds from the initiation of measurement in hot air of 90° C. is preferably 60% or more and 100% or less relative to the above maximum shrinkage stress. That is, the heat-shrinkable polyester film of the present invention features specific heat shrinkage properties such that the shrinkage stress almost comparable to the maximum heat shrinkage stress is developed even after 30 seconds from the initiation of shrinking by heat. If the shrinkage stress after 30 seconds/the maximum shrinkage stress×100 (hereinafter, the stress ratio) is less than 60%, at the time of covering a container with a label and shrinking the label by heating, the followability of the label deteriorates in the case where the container expands by heating, the label becomes slack when the temperature of the container is lowered after shrinking and then the heat expansion is eliminated, resulting in finish quality having not sufficient tightness, and this is not preferable. The stress ratio is more preferably 75% or more, further preferably 80% or more, and especially preferably 90% or more. Although a higher stress ratio is preferred because the followability is more improved, it is improbable that the shrinkage stress after 30 seconds from the initiation of measurement exceeds the maximum shrinkage stress, and therefore the upper limit thereof is 100%.

In the heat-shrinkable polyester film of the present invention, a constituent unit derived from diethylene glycol as a glycol component is contained preferably in an amount of 7 mol % or more and 30 mol % or less in 100 mol % of the whole polyester resin component. The amount of less than 7 mol % is not preferred because the shrinkage stress exceeds the range of the above-mentioned preferable shrinkage stress. The amount of more than 30 mol % is not preferred because heat resistance of the resin deteriorates, and troubles of generation of foreign matters are caused during melt extrusion. The amount of the constituent unit derived from diethylene glycol is more preferably 8 mol % or more and 29 mol % or less, further preferably 9 mol % or more and 28 mol % or less, and especially preferably 10 mol % or more and 27 mol % or less.

The heat-shrinkable polyester film of the present invention preferably has a tensile breaking strength of 80 MPa or more and 200 MPa or less in the direction orthogonal to the main shrinkage direction of the film. A method for measuring the tensile breaking strength will be described in Examples. If the tensile breaking strength is below 80 MPa, "stiffness" is low at the time of attaching the film on a container as a label application or a banding film application, and therefore it is not preferable. On the contrary, if the tensile breaking strength exceeds 200 MPa, the cutting property (easiness of tearing) in an initial stage at the time of tearing a label or a banding film is inferior, and therefore it is not preferable. The lower limit of the tensile breaking strength is more preferably 100 MPa or more, further preferably 110 MPa or more, and particularly preferably 120 MPa or more, and the upper limit is more preferably 190 MPa or less, further preferably 180 MPa or less, and particularly preferably 170 MPa or less.

The heat-shrinkable polyester film of the present invention preferably has a thickness irregularity of 13% or less in the main shrinkage direction of the film. If the thickness irregularity in the main shrinkage direction of the film is more than 13%, printing irregularity tends to occur at the time of printing a label, or shrinkage irregularity tends to occur after heat shrinkage, and therefore it is not so preferable.

The thickness of the heat-shrinkable polyester film of the present invention is not particularly limited, but as a heat-shrinkable film for a label application and a banding application, the thickness is preferably 5 to 100 μm, and more preferably 10 to 95 μm.

The heat-shrinkable polyester film of the present invention is not particularly limited in its production method, but the film can be obtained, for example, by melt-extruding the above-mentioned polyester raw material with an extruder to form an undrawn film and by drawing biaxially the undrawn film with a method as shown below.

When a raw material resin is melt-extruded, it is preferable to dry the polyester raw material using a dryer such as a hopper dryer or a paddle dryer, or a vacuum dryer. After the polyester raw material is dried in such a manner, it is melted at a temperature of 200 to 300° C. and extruded into a film form utilizing an extruder. In such an extrusion, an arbitrary conventional method such as a T-die method and a tubular method can be adopted.

Then, the sheet-like molten resin after extrusion is quenched so that an undrawn film can be obtained. As a method for quenching the molten resin, a method in which a molten resin is cast on a rotary drum from a spinneret and solidified by quenching to obtain a substantially unoriented resin sheet can be suitably adopted.

Furthermore, the undrawn film obtained is drawn in the width direction under predetermined conditions as described below and thereafter drawn in the longitudinal direction under predetermined conditions so that the heat-shrinkable polyester film of the present invention can be obtained. Hereinafter, preferable biaxial drawing for obtaining the heat-shrinkable polyester film of the present invention will be described.

[Preferable Drawing Method of Heat-Shrinkable Polyester Film]

An ordinary heat-shrinkable polyester film is produced by drawing an undrawn film in a direction to be shrunk. Conventionally, there has been a high demand for a heat-shrinkable polyester film shrinkable in the longitudinal direction. However, it is not preferable in terms of productivity to merely draw an undrawn film in the longitudinal direction since a tensile breaking strength in the width direction is significantly lowered, and a film having a wide width cannot be produced. Moreover, in an ordinary heat-shrinkable polyester film, raw materials containing amorphous components in a large amount are used in order to impart heat shrinkage properties to the film, and therefore the mixing rate of recycled raw materials is limited.

In the drawing method of the heat-shrinkable polyester film of the present invention, the draw ratios in the width direction and in the longitudinal direction are contrived. The draw ratios will be explained below.

[Draw Ratio in Width Direction]

The present inventors have made investigations and consequently found that a film obtained by using intentionally no amorphous PET raw materials has a high shrinkage in the drawing direction at a draw ratio of around two times. It has been also found that a shrinkage in the drawing direction is lowered and a shrinkage in the undrawing direction becomes high if the draw ratio is increased more than three times. As a result of the investigations, it is preferred that the film be first transversely drawn at a temperature of Tg+5° C. or higher and Tg+40° C. or lower at a draw ratio of 3.5 times or more and 6 times or less in order to biaxially draw the film to cause shrinkage in the longitudinal direction. If the draw ratio is less than 3.5 times, it is insufficient to lower the shrinkage in the width direction. The upper limit of the transverse draw ratio is not particularly limited, but if it is more than 6 times, drawing in the longitudinal direction is difficult to be carried out (so-called breakage tends to occur), and therefore it is not preferable. The transverse draw ratio is more preferably 3.7 times or more and 5.8 times or less, and further preferably 3.9 times or more and 5.6 times or less.

Since the draw ratio and the shrinkage of the film obtained by using PET raw materials which do not contain an amorphous component in a large amount have the above-described relation, the heat treatment after drawing in the width direction and before drawing in the longitudinal direction may or may not be carried out.

[Draw Ratio in Longitudinal Direction]

The draw ratio in the longitudinal direction is preferably 1.5 times or more and 2.7 times or less at a temperature of Tg+5° C. or higher and Tg+40° C. or lower. If it is less than 1.5 times, the shrinkage is insufficient, and if it is more than 2.7 times, the shrinkage in the width direction becomes high, and therefore it is not preferable as a film uniaxially shrinkable in the longitudinal direction. In addition, the draw ratio of more than 2.7 times is not preferable because a shrinkage stress in the longitudinal direction becomes high. The draw ratio is more preferably 1.6 times or more and 2.6 times or less, and further preferably 1.7 times or more and 2.5 times or less.

If the drawing temperature in the longitudinal direction is lower than Tg+5° C., breakage tends to occur at the time of drawing, and therefore it is not preferable. If the drawing temperature is higher than Tg+40° C., heat crystallization of the film is promoted and the shrinkage is lowered, and therefore it is not preferable. The drawing temperature is more preferably Tg+8° C. or higher and Tg+37° C. or lower, and further preferably Tg+11° C. or higher and Tg+34° C. or lower.

As described above, a preferable drawing method in the present invention includes, for example, controlling the draw ratio in the longitudinal direction to be lower than the draw ratio in the width direction.

[Heat Treatment and Relaxation in Width Direction]

It is preferable to carry out relaxation by 0% or more and 15% or less in the width direction while subjecting the film to heat treatment at a temperature of Tg or higher and Tg+40° C. or lower in the state of holding both ends of the film with clips. If the heat treatment temperature is lower than Tg, the heat treatment becomes meaningless and shrinkage over time at the time of storage after production (so-called natural shrinkage) becomes high, and therefore it is not preferable. If the heat treatment temperature is higher than Tg+40° C., heat crystallization of molecular chains is promoted and the shrinkage is lowered not only in the width direction but also in the longitudinal direction, and therefore it is not so preferable. The heat treatment temperature is more preferably Tg+3° C. or higher and Tg+37° C. or lower, and further preferably Tg+6° C. or higher and Tg+34° C. or lower. If the relaxation ratio in the width direction is less than 0%, drawing in the width direction is substantially caused, and it is not preferable as relaxation. The relaxation ratio may be more than 15%, but if the relaxation ratio is high, the width of a film as a product is finally narrowed, and therefore it is not preferable. The relaxation ratio is more preferably 1% or more and 14% or less, and further preferably 2% or more and 13% or less.

In the present invention, for the property uniaxially shrinkable in the longitudinal direction to be obtained by drawing the film at a relatively high draw ratio in the width direction and then drawing the film at a relatively low draw ratio in the longitudinal direction, it is considered to relate to the nature of crystalline PET which does not contain a large amount of a monomer component that can form an amorphous component. That is, as for crystalline PET, for example, if the film is drawn at a high draw ratio of 3.5 times or more in the width direction, molecular chains are oriented, and at the same time, crystallization of the molecular chains is promoted, and consequently this is supposed to be a factor functioning to lower the heat shrinkage in the width direction. In this respect, the draw ratio of about 2.7 times or less in the longitudinal direction is in a range where crystallization is not much promoted even if the molecular chains are oriented to a certain extent in the longitudinal direction, and therefore it is supposed that a relatively high heat shrinkage can be achieved. Naturally, it is thought that the relaxation heat treatment in the width direction also contributes to a certain degree of lowering a heat shrinkage in the width direction.

The package of the present invention is a package in which a banding film (and a label) obtained by using the heat-shrinkable polyester film of the present invention is covered at least on a part of the outer periphery of an object to be packaged and then to shrink by heat. The object to be packaged can be exemplified by PET bottles for beverage, various kinds of bottles, cans, confectionary, plastic containers for a box lunch and the like, paper-made boxes, and the like. In general, in the case where a label obtained by using a heat-shrinkable polyester film is covered on the packaging object and heat-shrunk, the banding film (and a label) is heat-shrunk by about 5 to 50% and closely attached on the package. Additionally, a banding film (and a label) covered on a packaging object may be printed or may not be printed.

A method for producing a banding film (and a label) is as follows; a rectangular film is rounded in the longitudinal direction to stack the end parts and bonded into a label-form, or a film wound as a roll is rounded in the longitudinal direction of the roll to stack the end parts on the film and bonded into a tube-form, which is cut into a label. As a method for bonding the films together, a known method such as fusion sealing, solvent bonding, bonding with hot-melt adhesive, and bonding with an energy ray-curable adhesive can be used.

The thickness irregularity in the drawing direction is very worsened if an undrawn film is drawn at a draw ratio of 2.7 times or less, and therefore, an undrawn film obtained by using PET raw materials has been hardly drawn at a draw ratio of around two times so far. However, it is found that if a film is once drawn at a high stretch ratio of 3.5 times or more in the width direction and then drawn at a draw ratio of around two times in the longitudinal direction, the thickness irregularity in the longitudinal direction is improved. This is considered to be because by once drawing an undrawn film at a high draw ratio in the width direction, the drawing stress and the stress-strain curve are changed at the time of drawing the once drawn film at a draw ratio of around two times in the longitudinal direction, different from the case of drawing an undrawn film in the longitudinal direction.

EXAMPLES

Hereinafter, the present invention is described in more detail by Examples, but the present invention is by no means limited to aspects of the Examples, and it can be suitably modified in the range not departing from the scope of the present invention. The composition of the raw materials used in Examples and Comparative Examples; the production condition for the films of Examples and Comparative Examples; and the result of the evaluation for the films of Examples and Comparative Examples are shown in Table 1, Table 2, and Table 3 respectively.

TABLE 1

| | composition of polyester raw material (mol %) | | | | addition amount of lubricant (ppm) |
|---|---|---|---|---|---|
| | dicarboxylic acid components | | glycol components | | |
| | DMT | IPA | EG | DEG | |
| Polyester A | 100 | 0 | 100 | 0 | 0 |
| Polyester B | 100 | 0 | 100 | 0 | 7200 |
| Polyester C | 100 | 0 | 40 | 60 | 0 |
| Polyester D | 100 | 0 | 40 | 60 | 7200 |
| Polyester E | 98 | 2 | 100 | 0 | 0 |
| Polyester F | 100 | 0 | 100 | 0 | 0 |

TABLE 2

| | raw material | DEG mol % | amorphous component mol % | transverse process | | lengthwise process | | relaxtion heat treament | |
|---|---|---|---|---|---|---|---|---|---|
| | | | | drawing temperature °C. | ratio | drawing temperature °C. | ratio | drawing temperature °C. | ratio % |
| Example 1 | A/C/D = 87/7/6 | 7.8 | 0 | 90 | 4.5 | 90 | 2 | 90 | 5 |
| Example 2 | A/C/D = 87/7/6 | 7.8 | 0 | 90 | 4.5 | 90 | 2.5 | 90 | 5 |
| Example 3 | A/C/D = 87/7/6 | 7.8 | 0 | 90 | 4.5 | 90 | 2.7 | 90 | 5 |
| Example 4 | A/C/D = 87/7/6 | 7.8 | 0 | 90 | 4.5 | 90 | 2.5 | 90 | 10 |
| Example 5 | A/C/D = 74/7/19 | 15.6 | 0 | 80 | 4.5 | 80 | 2 | 90 | 8 |
| Example 6 | A/C/D = 74/7/19 | 15.6 | 0 | 80 | 4.5 | 80 | 2.5 | 90 | 8 |
| Example 7 | A/C/D = 74/7/19 | 15.6 | 0 | 80 | 4.5 | 80 | 2.7 | 90 | 8 |
| Example 8 | A/C/D = 55/7/38 | 27 | 0 | 70 | 4.5 | 70 | 2 | 90 | 12 |
| Example 9 | A/C/D = 55/7/38 | 27 | 0 | 70 | 4.5 | 70 | 2.5 | 90 | 12 |
| Example 10 | A/C/D = 55/7/38 | 27 | 0 | 70 | 4.5 | 70 | 2.7 | 90 | 12 |
| Example 11 | A/C/D = 55/7/38 | 27 | 0 | 70 | 4.5 | 85 | 2.7 | 90 | 12 |
| Example 12 | E/C/D = 87/7/6 | 7.8 | 1.7 | 90 | 4.5 | 90 | 2 | 90 | 5 |
| Example 13 | F/C/D = 87//7/6 | 7.8 | 0 | 90 | 4.5 | 90 | 2 | 90 | 5 |
| Compartive Example 1 | A/B = 93/7 | 0 | 0 | 90 | 4.5 | 90 | 2 | 90 | 5 |
| Compartive Example 2 | A/C = 93/7 | 4.2 | 0 | 90 | 4.5 | 90 | 2 | 90 | 5 |

TABLE 3

| | thickness μm | Hot-Water Shrinkage of 90° C. | | Shrinkage Stress | | | Tensile Breaking Strength | Thickness Irregularity | Shrinkage Finishing Property | |
| --- | --- | --- | --- | --- | --- | --- | --- | --- | --- | --- |
| | | longitudinal direction % | width direction | maximum value Mpa | after 30 seconds | rate % | width direction Mpa | longitudinal direction % | Container Deformation | Separation of Bonded Portion |
| Example 1 | 18 | 40 | 6 | 8.6 | 8.3 | 97 | 151 | 7.7 | Good | Good |
| Example 2 | 18 | 43 | 7 | 9.6 | 9.4 | 98 | 152 | 7.2 | Good | Good |
| Example 3 | 18 | 36 | 7.2 | 9.9 | 9.8 | 99 | 154 | 7 | Good | Good |
| Example 4 | 18 | 35 | 3 | 9.5 | 9.4 | 99 | 150 | 7.2 | Good | Good |
| Example 5 | 18 | 38 | 7 | 7.6 | 7.3 | 96 | 131 | 7.3 | Good | Good |
| Example 6 | 18 | 40 | 8.6 | 8.6 | 8.3 | 97 | 135 | 6.9 | Good | Good |
| Example 7 | 18 | 36 | 8.7 | 9 | 8.8 | 98 | 136 | 6.1 | Good | Good |
| Example 8 | 18 | 37 | 8 | 3.4 | 3.1 | 91 | 114 | 7.3 | Good | Good |
| Example 9 | 18 | 38 | 8.5 | 4.4 | 4.2 | 95 | 115 | 6.8 | Good | Good |
| Example 10 | 18 | 35 | 8.8 | 4.8 | 4.7 | 98 | 117 | 6.3 | Good | Good |
| Example 11 | 18 | 18 | 1.5 | 2.5 | 2.4 | 96 | 116 | 5.9 | Good | Good |
| Example 12 | 18 | 39 | 6.5 | 8.7 | 8.4 | 97 | 149 | 7.6 | Good | Good |
| Example 13 | 18 | 38 | 6.2 | 8.6 | 8.3 | 97 | 182 | 7.8 | Good | Good |
| Compartive Example 1 | 18 | 40 | 5 | 13.4 | 13.1 | 98 | 180 | 8 | Poor | Poor |
| Compartive Example 2 | 18 | 38 | 6 | 10.8 | 10.6 | 98 | 168 | 7.7 | Poor | Poor |

In addition, the evaluation methods for films are as follows.

[Tg (Glass Transition Point)]

Using a differential scanning calorimeter (manufactured by Seiko Instruments Inc., DSC220), 5 mg of an undrawn film was put in a sample pan, the lid of the pan was closed, and the temperature was raised at a temperature rising speed of 10° C./minute from −40° C. to 120° C. in a nitrogen gas atmosphere to conduct measurement. Tg (° C.) was obtained based on JIS-K 7121-1987.

[Intrinsic Viscosity (IV)]

0.2 g of a polyester was dissolved in 50 ml of a solvent mixture of phenol/1,1,2,2-tetrachloroethane (60/40 (weight ratio)), and the intrinsic viscosity was measured at 30° C. using an Ostwald viscometer. The unit is dl/g.

[Heat Shrinkage (Hot-water Heat Shrinkage)]

A film was cut into a square of 10 cm×10 cm, dipped in hot water of a predetermined temperature ±0.5° C. in no load state for 10 seconds to be heat-shrunk, then the dimensions of the film in the lengthwise and transverse directions were measured, and heat shrinkage each was obtained according to the above Equation 1. The direction with the large heat shrinkage was defined as a main shrinkage direction.

[Shrinkage Stress]

A film sample with a strip-like shape of 2000 mm in length in the main shrinkage direction and 20 mm in width was cut out of a heat-shrinkable film and measured for the shrinkage stress using a strength and elongation measuring machine with a heating furnace (TESILON (registered trademark of Orientec Co., Ltd) universal testing instrument PTM-250) manufactured by Toyo Baldwin Co. (current company name: Orientec Co., Ltd). The heating furnace of the strength and elongation measuring machine was previously heated to 90° C., and the distance between chucks for holding the film sample was set to 100 mm. When the sample was fitted to the chucks of the strength and elongation measuring machine, the air blast blown into the heating furnace was once stopped, the door of the heating furnace was opened, 25 mm of both edges of the sample of 150 mm in the longitudinal direction were clipped with the respective chucks, the distance between the chucks was set to 100 mm, and the sample was fixed without looseness such that the longitudinal direction of the sample was conformed to the direction between the chucks and the sample became horizontal. After fixing the sample to the chucks, the door of the heating furnace was quickly closed, and the air blast was restarted. The point of time when the door of the heating furnace was closed and the air blast was restarted was taken as a measurement start point of shrinkage stress, and the shrinkage stress (MPa) after 30 seconds was obtained. The maximum value of the shrinkage stress measurement values from the measurement start point of shrinkage stress to 30 seconds after the start of measurement was taken as a maximum value of shrinkage stress (maximum shrinkage stress (MPa)). Note that when the shrinkage stress was measured, the distance between the chucks was fixed to 100 mm and the transition of shrinkage stress from the start of measurement to 30 seconds after the start of measurement was measured. The ratio of a shrinkage stress after 30 seconds from the measurement start point relative to the maximum shrinkage stress was defined as a shrinkage stress ratio (represented by the following equation).

Shrinkage stress ratio (%)=(shrinkage stress after 30 seconds)÷(maximum shrinkage stress)×100

[Tensile Breaking Strength]

A test specimen with a strip-like shape of 140 mm in the measurement direction (the width direction of the film) and 20 mm in the direction orthogonal to the measurement direction (the longitudinal direction of the film) was prepared. Using a universal tensile testing machine "DSS-100" (manufactured by SHIMADZUI CORPORATION), each of 20 mm grasping margins located at both ends of the test specimen was fixed to a chuck (the distance between chucks of 100 mm), the tensile test was performed under the conditions of an atmospheric temperature of 23° C. and a tensile speed of 200 mm/minute, and the strength (stress) at the time of being torn and broken was defined as the tensile breaking strength.

[Thickness Irregularity in Longitudinal Direction]

A film was subjected to a sampling into a long roll in a size of length 30 m×width 40 mm, and the thickness was continuously measured along the longitudinal direction of the sample film at a speed of 5 (m/minute) using a thickness meter of a continuously contacting type manufactured by MIKURON. In the sampling of a roll-shaped film specimen as described above, the longitudinal direction of the film specimen was defined as the main shrinkage direction. The thickness irregularity of each film in the longitudinal direction was calculated from the following Equation 2 where Tmax. is the maximum thickness and Tmin. is the minimum thickness upon the measurement while Tave. is an average thickness.

$$\text{Thickness irregularity} = \{(T\text{max.} - T\text{min.})/T\text{ave.}\} \times 100 \, (\%) \quad \text{Equation 2}$$

[Shrinkage Finishing Property/Container Deformation (Banding Film Application for Box Lunch Container)]

A film was wrapped around a thin-walled polypropylene container (side: 150×150 mm, height: 100 mm) of a box lunch so as to bundle the body part and the lid part of the container such that the circumferential direction of the container corresponds to the shrinkage direction of the film. After fusion-sealing at 220° C., the film was heat-shrunk in a shrink tunnel of a preset temperature of 90° C. The FIGURE shows a top view of the box lunch container, wherein the length Y from one side to the other side opposite was measured at 5 mm pitch before attaching the film, the length Y' at each of the same places was similarly measured after attaching and heat-shrinking the film, and the absolute value of the difference between Y and Y' was defined as L. The maximum value Lmax of Ls calculated from the lengths measured at 5 mm pitch was obtained, and one having a large Lmax was judged as having a large container deformation. The criteria were as follows.
Good: Lmax≤4 mm
Fair: 4 mm<Lmax≤5 mm
Poor: 5 mm<Lmax
[Shrinkage Finishing Property/Separation of Bonded Portion (Bottle Label Application)]

On a heat-shrinkable film, a three color-printing with green, gold and white inks of Tobyo Ink Mfg Co., Ltd. was provided previously. By bonding both end parts of the printed film with a commercially available ethylene-vinyl acetate based hot melt adhesive, a cylindrical-shaped label (a cylindrical label in which the main shrinkage direction of the heat-shrinkable film was the circumferential direction, and the outer circumferential length was 1.05 times the outer circumferential length of a bottle on which the label was attached) was prepared. Thereafter, the cylindrical-shaped label was put on a PET bottle of 500 mL (trunk diameter: 62 mm, minimum diameter of neck part: 25 mm) and subjected to heat shrinkage at a zone temperature of 80° C. with a passing time of 2.5 seconds using a steam tunnel (model: SHI-1500-L) manufactured by Fuji Astec Inc. to attach the label on the bottle. In attachment, the position of a part with a diameter of 55 mm in the neck part was adjusted so as to be at one end of the label. The label of which the bonded portion was separated after shrinking was determined as a defective piece, and 100 labels were produced from one sample, the percentage of defective pieces out of 100 labels shrinkage-finished was calculated as a defective percentage (%), and the defective percentage (%) was evaluated according to the following criteria.
Good: 1% or less
Fair: 2% or more and 5% or less
Poor: 6% or more In addition, polyester used in Examples and Comparative Examples are as follows.

100 mol % of dimethyl terephthalate (DMT) as a dicarboxylic acid component and 100 mol % of ethylene glycol (EG) as a glycol component were placed in a stainless steel autoclave equipped with a stirrer, a thermometer and a partially circulating cooler such that the amount of ethylene glycol was 2.2 times the amount of dimethyl terephthalate in terms of the molar ratio, 0.05 mol % (based on the acid component) of zinc acetate was added as an ester exchange catalyst, 0.225 mol % (based on the acid component) of antimony trioxide was added as a polycondensation catalyst, and an ester exchange reaction was carried out while distilling away generated methanol to outside the system. Thereafter, a polycondensation reaction was carried out at 280° C. under a reduced pressure of 26.7 Pa to obtain polyester A having an intrinsic viscosity of 0.75 dl/g. The composition is shown in Table 1.

Synthetic Examples B to D

Polyesters B to D shown in Table 1 were prepared in the same manner as in Synthetic Example A. In the production of polyesters B and D, SiO2 (Silysia 266, manufactured by FUJI SILYSIA CHEMICAL LTD.; average particle diameter: 1.5 μm) was added as a lubricant at a proportion of 7,200 ppm relative to the polyester. In the Table, DEG is diethylene glycol. The intrinsic viscosities of respective polyester were B: 0.7 dl/g, C: 0.65 dl/g and D: 0.65 dl/g, respectively. Each polyester was appropriately formed into a chip.

Polyester E is a recycled raw material ("Clear pellet", produced by Yono PET Bottle Recycle Co., Ltd.) and has an intrinsic viscosity of 0.63 dl/g. This polyester E contains 2 mol % of isophthalic acid in the whole dicarboxylic acid component constituting the polyester as shown in Table 1.

Polyester F was prepared by the following production method. To a mixture of terephthalic acid purified from a petroleum-derived material and ethylene glycol purified from a plant-derived material, magnesium acetate tetrahydrate was added such that the content of Mg atoms is 70 ppm in the polyester, and the resulting mixture was subjected to an esterification reaction under normal pressure at a temperature of 255° C. Then, antimony trioxide in an amount such that the content of Sb atoms is 280 ppm in the polyester and trimethyl phosphate in an amount such that the content of P atoms is 40 ppm in the polyester were added to the mixture, and the resulting mixture was further allowed to react at a temperature of 260° C. Subsequently, the reaction product was transferred to a polycondensation reactor, the reaction system was gradually depressurized while the temperature was raised by heating, and polycondensation was carried out at 280° C. under reduced pressure of 133 Pa (1 mmHg) by a conventional method, whereby a polyester chip having an intrinsic viscosity of 0.62 dl/g was obtained. The biomass degree was measured and found to be 17%.

Example 1

Polyester A, Polyester C and Polyester D as described above were mixed in the weight ratio of 87:7:6, and the mixed resin was charged into an extruder. The mixed resin was molten at 280° C. and extruded from a T-die, and then quenched by winding the molten resin around a rotating metal roll set at a surface temperature of 30° C. to obtain an undrawn film with a thickness of 162 μm. Tg of the undrawn film was 72° C. Thereafter, the obtained undrawn film was introduced to a transversely drawing apparatus (hereinafter, referred to as a tenter). The undrawn film introduced into the tenter was preheated till the film temperature reached 100° C. (Tg+28° C.), and then drawn by 4.5 times in the transverse direction at 90° C. (Tg+18° C.). The transversely drawn film as such was introduced into a lengthwise drawing machine in which a plurality of rolls were continuously disposed, preheated on a preheating roll till the film temperature reached 90° C. (Tg+18° C.), and thereafter drawn by two times using the difference in rotation speed between the rolls. Thereafter, the lengthwise drawn film was forcibly cooled with cooling rolls set at a surface temperature of 25° C. Then, the cooled film was introduced into a tenter (second tenter), and relaxed by 5% in the width direction of the film while being subjected to heat treatment in an atmosphere of 90° C. for 8 seconds in the second tenter. After the treatment in the second tenter, both end parts were cut and removed to continuously form a biaxially drawn film with a thickness of about 18 μm for a prescribed length, and thus a film roll of a heat-shrinkable polyester film was obtained. The properties of the obtained film were evaluated with the above-mentioned methods. The evaluation results are shown in Table 3. As a result of the evaluation, the film had adequate shrinkage property and good shrinkage finishing property with less separation of the bonded portion and less deformation of the container due to low shrinkage stress.

Example 2

A film was produced in the same manner as that in Example 1 except that the draw ratio in the longitudinal direction was set to 2.5 times, and the amount of the molten mixed resin extruded from a T-die was adjusted so as to allow the thickness of the film after drawing in the longitudinal direction to be 18 μm. As a result of the evaluation, the film had adequate shrinkage property and good shrinkage finishing property with less separation of the bonded portion and less deformation of the container due to low shrinkage stress.

Example 3

A film was produced in the same manner as that in Example 1 except that the draw ratio in the longitudinal direction was set to 2.7 times, and the amount of the molten mixed resin extruded from a T-die was adjusted so as to allow the thickness of the film after drawing in the longitudinal direction to be 18 μm. As a result of the evaluation, the film had adequate shrinkage property and good shrinkage finishing property with less separation of the bonded portion and less deformation of the container due to low shrinkage stress.

Example 4

A film was produced in the same manner as that in Example 1 except that the relaxation ratio were changed to 10% in the relaxation while being subjected to heat treatment, which was a process after drawing in the longitudinal direction, and the amount of the molten mixed resin extruded from a T-die was adjusted so as to allow the thickness of the film to be 18 μm. As a result of the evaluation, the film had adequate shrinkage property and good shrinkage finishing property with less separation of the bonded portion and less deformation of the container due to low shrinkage stress.

Example 5

Polyester A, Polyester C and Polyester D as described above were mixed in the weight ratio of 74:7:19, and the mixed resin was charged into an extruder. The mixed resin was molten at 280° C. and extruded from a T-die, and then quenched by winding the molten resin around a rotating metal roll set at a surface temperature of 30° C. to obtain an undrawn film with a thickness of 162 μm. Tg of the undrawn film was 65° C. Thereafter, the obtained undrawn film was introduced to a transversely drawing apparatus (hereinafter, referred to as a tenter). The undrawn film introduced into the tenter was preheated till the film temperature reached 90° C. (Tg+25° C.), and then drawn by 4.5 times in the transverse direction at 80° C. (Tg+15° C.). The transversely drawn film as such was introduced into a lengthwise drawing machine in which a plurality of rolls were continuously disposed, preheated on a preheating roll till the film temperature reached 80° C. (Tg+15° C.), and thereafter drawn by two times using the difference in rotation speed between the rolls. Thereafter, the lengthwise drawn film was forcibly cooled with cooling rolls set at a surface temperature of 25° C. Then, the cooled film was introduced into a tenter (second tenter), and relaxed by 8% in the width direction of the film while being subjected to heat treatment in an atmosphere of 90° C. for 8 seconds in the second tenter. After the treatment in the second tenter, both end parts were cut and removed to continuously form a biaxially drawn film with a thickness of about 18 μm for a prescribed length, and thus a film roll of a heat-shrinkable polyester film was obtained. The properties of the obtained film were evaluated with the above-mentioned methods. The evaluation results are shown in Table 3. As a result of the evaluation, the film had adequate shrinkage property and good shrinkage finishing property with less separation of the bonded portion and less deformation of the container due to low shrinkage stress.

Example 6

A film was produced in the same manner as that in Example 5 except that the draw ratio in the longitudinal direction was set to 2.5 times, and the amount of the molten mixed resin extruded from a T-die was adjusted so as to allow the thickness of the film after drawing in the longitudinal direction to be 18 μm. As a result of the evaluation, the film had adequate shrinkage property and good shrinkage finishing property with less separation of the bonded portion and less deformation of the container due to low shrinkage stress.

Example 7

A film was produced in the same manner as that in Example 5 except that the draw ratio in the longitudinal direction was set to 2.7 times, and the amount of the molten mixed resin extruded from a T-die was adjusted so as to allow the thickness of the film after drawing in the longitudinal direction to be 18 μm. As a result of the evaluation, the film had adequate shrinkage property and good shrinkage finishing property with less separation of the bonded portion and less deformation of the container due to low shrinkage stress.

Example 8

Polyester A, Polyester C and Polyester D as described above were mixed in the weight ratio of 55:7:38, and the mixed resin was charged into an extruder. The mixed resin was molten at 280° C. and extruded from a T-die, and then quenched by winding the molten resin around a rotating metal roll set at a surface temperature of 30° C. to obtain an undrawn film with a thickness of 162 μm. Tg of the undrawn film was 55° C. Thereafter, the obtained undrawn film was introduced to a transversely drawing apparatus (hereinafter, referred to as a tenter). The undrawn film introduced into the tenter was preheated till the film temperature reached 80° C. (Tg+25° C.), and then drawn by 4.5 times in the transverse direction at 70° C. (Tg+15° C.). The transversely drawn film as such was introduced into a lengthwise drawing machine in which a plurality of rolls were continuously disposed, preheated on a preheating roll till the film temperature reached 70° C. (Tg+15° C.), and thereafter drawn by two times using the difference in rotation speed between the rolls. Thereafter, the lengthwise drawn film was forcibly cooled with cooling rolls set at a surface temperature of 25° C. Then, the cooled film was introduced into a tenter (second tenter), and relaxed by 12% in the width direction of the film while being subjected to heat treatment in an atmosphere of 90° C. for 8 seconds in the second tenter. After the treatment in the second tenter, both end parts were cut and removed to continuously form a biaxially drawn film with a thickness of about 18 µm for a prescribed length, and thus a film roll of a heat-shrinkable polyester film was obtained. The properties of the obtained film were evaluated with the above-mentioned methods. The evaluation results are shown in Table 3. As a result of the evaluation, the film had adequate shrinkage property and good shrinkage finishing property with less separation of the bonded portion and less deformation of the container due to low shrinkage stress.

Example 9

A film was produced in the same manner as that in Example 8 except that the draw ratio in the longitudinal direction was set to 2.5 times, and the amount of the molten mixed resin extruded from a T-die was adjusted so as to allow the thickness of the film after drawing in the longitudinal direction to be 18 µm. As a result of the evaluation, the film had adequate shrinkage property and good shrinkage finishing property with less separation of the bonded portion and less deformation of the container due to low shrinkage stress.

Example 10

A film was produced in the same manner as that in Example 8 except that the draw ratio in the longitudinal direction was set to 2.7 times, and the amount of the molten mixed resin extruded from a T-die was adjusted so as to allow the thickness of the film after drawing in the longitudinal direction to be 18 µm. As a result of the evaluation, the film had adequate shrinkage property and good shrinkage finishing property with less separation of the bonded portion and less deformation of the container due to low shrinkage stress.

Example 11

A film was produced in the same manner as that in Example 10 except that the film was preheated on a preheating roll till the film temperature reached 85° C. (Tg+30° C.) in a lengthwise drawing machine, and thereafter was lengthwise drawn. As a result of the evaluation, the film had adequate shrinkage property and good shrinkage finishing property with less separation of the bonded portion and less deformation of the container due to low shrinkage stress.

Example 12

A film was produced in the same manner as that in Example 1 except that polyester E, polyester C, and polyester D as described above were mixed in the weight ratio of 87:7:6 and charged into an extruder. Tg of the undrawn film was 72° C. As a result of the evaluation, the film had adequate shrinkage property and good shrinkage finishing property with less separation of the bonded portion and less deformation of the container due to low shrinkage stress.

Example 13

A film was produced in the same manner as that in Example 1 except that polyester F, polyester C, and polyester D as described above were mixed in the weight ratio of 87:7:6 and charged into an extruder. Tg of the undrawn film was 72° C. As a result of the evaluation, the film had adequate shrinkage property and good shrinkage finishing property with less separation of the bonded portion and less deformation of the container due to low shrinkage stress.

Comparative Example 1

A film was produced in the same manner as that in Example 1 except that polyester A and polyester B as described above were mixed in the weight ratio of 93:7 and charged into an extruder. Tg of the undrawn film was 75° C. As a result of the evaluation, although the film had adequate shrinkage property, separation of the bonded portion and deformation of the container occurred due to high shrinkage stress, and thus the film did not have good shrinkage finishing property.

Comparative Example 2

A film was produced in the same manner as that in Example 1 except that polyester A and polyester C as described above were mixed in the weight ratio of 93:7 and charged into an extruder. Tg of the undrawn film was 74° C. As a result of the evaluation, although the film had adequate shrinkage property, separation of the bonded portion and deformation of the container occurred due to high shrinkage stress, and thus the film did not have good shrinkage finishing property.

INDUSTRIAL APPLICABILITY

The heat-shrinkable polyester film of the present invention has excellent properties as describe above and thus can be used suitably as a label application for a bollte and a banding film application to bind a box lunch or the like. A package by using the above film as a label or banding film shows a good appearance. The film has a sufficient heat shrinkage in the longitudinal direction even if it contains an extremely low content of a monomer component that can form an amorphous component in polyester, and therefore the mixing rate of recycled raw materials in the film can be increased and thus the film is proper in terms of environmental awareness.

The invention claimed is:
1. A heat-shrinkable polyester film comprising ethylene terephthalate as a main constituent component and containing 0 mol % or more and 5 mol % or less of a monomer component that can form an amorphous component in a whole polyester resin component, wherein the heat-shrinkable polyester film satisfies the following requirements (1) to (4):
(1) the film has a hot-water heat shrinkage of 15% or more and 50% or less in a main shrinkage direction of the film when treated for 10 seconds in hot water of 90° C.;

(2) the film has a hot-water heat shrinkage of 0% or more and 12% or less in a direction orthogonal to the main shrinkage direction of the film when treated for 10 seconds in hot water of 90° C.;

(3) the film has a maximum shrinkage stress of 2 MPa or more and 10 MPa or less in the main shrinkage direction of the film when measured under hot air of 90° C.; and (4) the film contains 7 mol % or more and 30 mol % or less of a constituent unit derived from diethylene glycol in 100 mol % of the whole polyester resin component.

2. The heat-shrinkable polyester film according to claim 1, wherein the main shrinkage direction is the longitudinal direction of the film.

3. The heat-shrinkable polyester film according to claim 1, wherein the film has a tensile breaking strength of 80 MPa or more and 200 MPa or less in the direction orthogonal to the main shrinkage direction of the film.

4. The heat-shrinkable polyester film according to claim 3, wherein the film has a thickness irregularity of 13% or less in the main shrinkage direction of the film.

5. The heat-shrinkable polyester film according to claim 4, wherein in a measurement of a shrinkage stress in the main shrinkage direction of the film under hot air of 90° C., a shrinkage stress after 30 seconds from the initiation of the measurement is 60% or more and 100% or less relative to the maximum shrinkage stress.

6. The heat-shrinkable polyester film according to claim 5, wherein the main shrinkage direction is the longitudinal direction of the film.

7. A package having a label derived from the heat-shrinkable polyester film according to claim 6 at least a part of an outer periphery of an object to be packaged.

8. The heat-shrinkable polyester film according to claim 3, wherein in a measurement of a shrinkage stress in the main shrinkage direction of the film under hot air of 90° C., a shrinkage stress after 30 seconds from the initiation of the measurement is 60% or more and 100% or less relative to the maximum shrinkage stress.

9. The heat-shrinkable polyester film according to claim 8, wherein the main shrinkage direction is the longitudinal direction of the film.

10. The heat-shrinkable polyester film according to claim 3, wherein the main shrinkage direction is the longitudinal direction of the film.

11. The heat-shrinkable polyester film according to claim 4, wherein the main shrinkage direction is the longitudinal direction of the film.

12. The heat-shrinkable polyester film according to claim 1, wherein the film has a thickness irregularity of 13% or less in the main shrinkage direction of the film.

13. The heat-shrinkable polyester film according to claim 12, wherein in a measurement of a shrinkage stress in the main shrinkage direction of the film under hot air of 90° C., a shrinkage stress after 30 seconds from the initiation of the measurement is 60% or more and 100% or less relative to the maximum shrinkage stress.

14. The heat-shrinkable polyester film according to claim 13, wherein the main shrinkage direction is the longitudinal direction of the film.

15. The heat-shrinkable polyester film according to claim 12, wherein the main shrinkage direction is the longitudinal direction of the film.

16. The heat-shrinkable polyester film according to claim 1, wherein in a measurement of a shrinkage stress in the main shrinkage direction of the film under hot air of 90° C., a shrinkage stress after 30 seconds from the initiation of the measurement is 60% or more and 100% or less relative to the maximum shrinkage stress.

17. The heat-shrinkable polyester film according to claim 16, wherein the main shrinkage direction is the longitudinal direction of the film.

18. A package having a label derived from the heat-shrinkable polyester film according to claim 1 at least a part of an outer periphery of an object to be packaged.

* * * * *